United States Patent Office 3,631,158
Patented Dec. 28, 1971

3,631,158
NEW AND USEFUL SULPHUR COMPOSITIONS
AND THEIR PREPARATION
Christian Esclamadon, Billere, Yves Labat, Pau, and Jean-Baptiste Signouret, Billere, France, assignors to Societe Anonyme dite: Societe Nationale des Petroles d'Aquitaine, Courbevoie, France
No Drawing. Filed Jan. 29, 1970, Ser. No. 6,932
Claims priority, application France, Jan. 31, 1969, 6902061
Int. Cl. C08g 23/00
U.S. Cl. 260—79 R
7 Claims

ABSTRACT OF THE DISCLOSURE

New plastic sulphur compositions are prepared by causing molten sulphur to react with one or more cyclic polysulphides of the formula:

$$\left[\left(\underset{\mathrm{CH}}{\overset{R}{|}}\right)_n - (X)_z - \left(\underset{\mathrm{CH}}{\overset{R'}{|}}\right)_m\right]$$
$$\overline{\phantom{xx}(S)_r\phantom{xx}}$$

in which $r$ is 2 or 3, $z$ is 0 or 1, $n$ and $m$ are each from 1 to 8, R and R', which may be the same or different, are each hydrogen, a monovalent hydrocarbon radical containing 1 to 12 carbon atoms, which radicals can be saturated or unsaturated aliphatic radicals, saturated or unsaturated cycloalkyl radicals, or aromatic radicals, and X is any of the following: —NH, —O—, —S—

$$-\underset{\underset{R''}{|}}{\overset{|}{C}}-H-$$

(in which R'' can be H, $CH_3$ or OH)

—O—$(CH_2)_p$—O— and —S—$(CH_2)_p$—S— (p being from 1 to 6).

The present invention relates to new plastic compositions containing sulphur, and also to processes for their preparation and use.

At the present time, plasticised sulphur is a material which is of interest to a number of industries. In particular, it can be used for floor coverings and for the marking of roadways; there are also applications for it in the building industry. It is thus necessary to be able to obtain this material in large quantities and under the best conditions as regards safety, using a process which does not present any avoidable danger.

The major part of the plasticised sulphur used at the present time is prepared by incorporating into the sulphur a plasticiser which is an organic compound, frequently sulphurised, and which has one or two mercaptan functions. During the plasticising there is a reaction between the molten sulphur and the mercaptan functions; a corresponding part of the hydrogen sulphide is released, and this necessitates a special trapping installation or even the use of a torch for burning the $H_2S$. Moreover, the $H_2S$ which is formed in the reaction medium (plasticiser+sulphur) is released in the form of bubbles, which produce a porous structure in the plastic mass.

The plasticised sulphur obtained with the aid of a plasticiser having mercaptan functions consequently has a certain number of defects. Its mechanical properties are very clearly reduced, relatively to a plasticised sulphur which does not have a porous structure; moreover, at the moment of using the remelted material, a certain quantity of $H_2S$ is still released and this raises technological problems at the time of use.

The present invention sets out to resolve these different problems, because it uses, as a plasticiser sulphur compounds which do not release hydrogen sulphide during their reaction with the molten sulphur. Furthermore, the plastic compositions which are obtained have a very homogeneous structure, which permits them to be used for purposes where good mechanical properties are essential.

The process according to the invention involves causing the molten sulphur to react with a more or less large quantity of one or more cyclic polysulphides.

The cyclic polysulphides which are suitable for obtaining plastic compositions containing sulphur in accordance with the invention correspond to the general Formula I:

$$\left[\left(\underset{\mathrm{CH}}{\overset{R}{|}}\right)_n - (X)_z - \left(\underset{\mathrm{CH}}{\overset{R'}{|}}\right)_m\right]$$
$$\overline{\phantom{xx}(S)_r\phantom{xx}}$$

in which: $r$ is 2 or 3; $z$ is 0 to 1; $n$ and $m$ are each from 1 to 8; R and R', which can also be the same or different, are each hydrogen, or a monovalent hydrocarbon radical containing from 1 to 12 carbon atoms; these hydrocarbon radicals can be saturated or unsaturated aliphatic radicals, saturated or unsaturated cycloalkyl radicals, or aromatic radicals; X can be any one of the following groups:
—NH—, —O—, —S—

$$-\underset{\underset{R''}{|}}{\overset{|}{C}}-H$$

(in which R'' can be H, $CH_3$ or —OH),

—O—$(CH_2)_p$—O— and —S—$(CH_2)_p$—S (the value of $p$ being from 1 to 6).

All the cyclic disulphides or trisulphides which conform to the above general Formula I are suitable. They plasticise the sulphur by reaction with the latter when they are mixed with molten sulphur. They can be obtained by processes similar to those used for the preparation of cyclic polysulphides.

Interesting results are obtained when the sulphur is plasticised with cyclic disulphides or trisulphides which are obtained from linear polysulphides the degree of polymerisation of which is at least 4, the α and ω positions being occupied by thiol functions by OH, by chlorine, or by any other suitable functional groups. These polysulphides correspond to the Formula II:

$$M-\left(\underset{\mathrm{CH}}{\overset{R}{|}}\right)_n-X-\left(\underset{\mathrm{CH}}{\overset{R'}{|}}\right)_m-S-\left[S\left(\underset{\mathrm{CH}}{\overset{R}{|}}\right)_n-X-\left(\underset{\mathrm{CH}}{\overset{R'}{|}}\right)_m-S\right]_q-S-\left(\underset{\mathrm{CH}}{\overset{R}{|}}\right)_n-X-\left(\underset{\mathrm{CH}}{\overset{R''}{|}}\right)_m-N$$

in which $m$, $n$, R, R' and X have the same meanings as given above, $q$ has a mean value from 4 to 24, M and N, which may be the same or different, correspond to the α and ω positions of the linear polysulphides.

Polysulphides which are particularly suitable for the preparation of cyclic disulphides are those in which X is replaced by the CH—OH group; it has been possible to show that the presence of OH groups within a plasticiser imparts a good tensile strength to the plasticised sulphur. Such compounds are described in French patent specification No. 1,425,283. What is involved is a polythiomethylene alkanol resin of formula H—[S—$CH_2$—CHOH—$CH_2$—S—]$_p$—H This is obtained by simultaneous reaction of a haloepoxyalkane on an alkali or alkaline earth polysulphide in the presence of hydrogen sulphide.

The cyclic disulphide obtained is 4-hydroxy-1,2-dithiolane.

Cyclic disulphides in which the X group is sulphur, oxygen or an O—CH$_2$—O group are also particularly suitable.

By way of example, 1,2,4-trithiolane, 1-oxa-4,5-dithiacycloheptane, 1,5,6-trithiacyclononane, 1,3-dioxa-6,7-dithiacyclononane, 1,3-dioxa-7,8-dithiacycloundecane, 1,3-dioxa-8,9-dithiacyclotridecane, and 1,2-dithiacyclooctane can be mentioned.

The cyclic disulphides or trisulphides act as true sulphur plasticisers; there is reaction between the molten sulphur and the polysulphides without release of H$_2$S. As a result, a polysulphide polymer is obtained which is loaded to a greater or lesser degree with elementary sulphur, depending on the proportion of sulphur employed.

The plasticiser can be used in all proportions; in particular, depending on the intended use, it is possible to add this product to the sulphur in very variable proportions, for example, from 1% to 99% by weight. If the plastic composition contains from 0.5% to 30% by weight of sulphur, it has the properties which are characteristic of a gum or an elastomer and can thus be used as a seal or as a mastic, while having the advantage of high resistance to chemical agents because of its high sulphur content. On the other hand, when using a composition containing 30% to 99% by weight of sulphur, a plastic composition is obtained for which numerous applications have been found; it forms an excellent coating, especially for concrete, asphalt (for the provision of marking strips on roadways), brickwork or other similar materials; it can be used as a flooring or walling material; this plastic product can also be used as a floor covering by direct casting, possibly with a mixture of sand and/or gravel, with which it forms a cement.

It is found that the sulphur composition which is obtained can be modified by any of the means used at the present time which have for their purpose to impart to the material a better adhesive property and non-inflammability. Balls of a plastics material, rubber or glass, or suitable colouring agents or dyes, can also be incorporated into the plasticised sulphur (especially for the provision of roadway markings).

The reaction between the molten sulphur and the cyclic polysulphide plasticiser can be carried out in a large range of temperatures, but they can best be between 120° and 250° C., and preferably between 140° and 160° C. An energetic agitation is necessary to obtain a homogeneous mixture.

Using the process according to the present invention, this reaction can be effected in an open container, whereas in the preperation of the previously described compositions, it was necessary to provide for the destruction of the H$_2$S formed during the reaction.

The reaction time can be between 30 minutes and several hours; this time depends on the polysulphide which is used.

The reaction normally takes place without catalysts; however, the speed of reaction can be accelerated if the reaction medium has added thereto a catalyst which is formed by an organic base and, particularly, by a tertiary aliphatic amine, or any other basic catalyst.

After the reaction, the plasticised sulphur can be stored in blocks or in granulated form. After each test, it is possible to pour plasticised sulphur into moulds so as to obtain test elements and to determine the mechanical properties of the material.

These mechanical properties are at the same time a function of the quantity of plasticiser which is used, and also of its chemical nature. In the case of plasticised sulphur, three measurements are established: the vitreous transition temperature $T_g$; the tensile strength $R_t$ (measured by means of an Instron machine, with a speed of elongation of 0.5 cm./minute); the impact resistance or resilience $R_c$ (measured by means of a Dynstat flexometer). The measurements are made on cast test elements after eight days.

The following examples illustrate the invention.

EXAMPLE 1

Using a stainless steel container, 180 g. of sulphur in flaked form are melted and the temperature is kept at 145° C.; 20 g. of 4-hydroxy-1,2-dithiolane are introduced in portions and in 20 minutes, while stirring vigorously. The viscosity increases substantially and these operating conditions are maintained for one hour. Some of the reaction mixture is poured into moulds for the manufacture of test elements on which, after eight days, the various tests are carried out:

Vitreous transition temperature $(T_g)=0°$ C.
Tensile strength $(R_t)=24.5$ kg./cm$^2$.
Impact resistance $(R_c)=90$ g. cm./cc.

EXAMPLE 2

The procedure is as in Example 1, but using 30 g. of 1,2,4-trithiolane and 170 g. of elementary sulphur. A sulphur composition is obtained which has the following characteristics:

$T_g=-20°$ C.
$R_t=9$ kg./cm$^2$.
$R_c=120$ g. cm./cc.

EXAMPLE 3

180 g. of molten sulphur are energetically mixed with 20 g. of 1-oxa-4,5-dithiacycloheptane, the other conditions being identical with those of Example 1.

The product obtained has a vitreous transition temperature of $-20°$ C.

EXAMPLE 4

180 g. of molten sulphur are mixed with 20 g. of 1,5,6-trithiacyclononane.

The product obtained has the characteristics:

$T_g=-47°$ C.
$R_t=14$ kg./cm.$^2$
$R_c=173$ g. cm./cc.

EXAMPLE 5

To 180 g. of molten sulphur, kept at 150° C., are added, in portions and while stirring, 20 g. of 1,3-dioxa-6,7-dithiacyclononane. These conditions are maintained for one hour; the homogeneous composition thus obtained has the characteristics:

$T_g=-42°$ C.
$R_t=14.5$ kg./cm.$^2$
$R_c=122$ g. cm./cc.

EXAMPLE 6

180 g. of molten sulphur and 20 g. of 1,3-dioxa-7,8-dithiacycloundecane are used. The vitreous transition temperature of the plasticised sulphur is $-48°$ C.

EXAMPLE 7

In this example, the preceding disulphide is replaced by 1,3-dioxa-8,9-dithiacyclotridecane, while maintaining the same working conditions. The composition obtained has the following properties:

$T_g=-60°$ C.
$R_c=86$ g. cm./cc.

EXAMPLE 8

A sulphur composition is obtained by reacting 170 g. of molten sulphur with 30 g. of 1,2-dithiacyclooctane.

The plastic sulphur composition which is obtained has the following characteristics:

$T_g=-50°$ C.
$R_t=19$ kg./cm.$^2$
$R_c=874$ g. cm./cc.

We claim:
1. A plastic sulphur composition which is formed by reacting at a temperature ranging between 120° and 250° C., sulphur and at least one cyclic polysulphide which is reactive with sulphur of the general formula

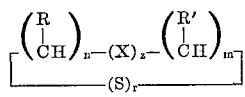

wherein $r$ is 2 or 3; $z$ is 0 or 1; $n$ and $m$ are each from 1 to 8; R and R', which may be the same or different, are each selected from the group consisting of hydrogen, monovalent hydrocarbon radicals containing 1 to 12 carbon atoms, saturated and unsaturated aliphatic radicals, saturated and unsaturated cycloalkyl radicals, and aromatic radicals; and X is selected from the group consisting of —NH—, —O—, —S—

—O—$(CH_2)_p$—O—, and —S—$(CH_2)_p$—S—, $p$ being 1 to 6 and R" is selected from the group consisting of H, $CH_3$ and OH.

2. A composition according to claim 1, wherein the said cyclic polysulphide is selected from 4-hydroxy-1,2-dithiolane, 1,2,4-trithiolane, 1-oxa-4,5-dithiacycloheptane, 1,5,6-trithiacyclononane, 1,3-dioxa-6,7-dithiacyclononane, 1,3 - dioxa-7,8-dithiacycloundecane, 1,3-dioxa-8,9-dithiacyclotridecane and 1,2-dithiacyclooctane, and from mixtures of at least two of these polysulphides.

3. A composition according to claim 1 containing 0.5% to 99% be weight of sulphur.

4. A plastic sulphur composition according to claim 1, containing from 30% to 99% by weight of sulphur.

5. A process for the preparation of plastic sulphur compositions, which comprises reacting sulphur at temperatures in the range 120° to 250° C. with vigorous agitation, with at least one cyclic polysulphide having the general formula

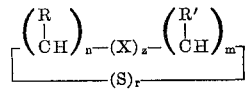

in which $r$ is 2 or 3; $z$ is 0 or 1; $n$ and $m$ are each from 1 to 8; R and R', which may be the same or different, are each selected from hydrogen, monovalent hydrocarbon radicals containing 1 to 12 carbon atoms, saturated and unsaturated aliphatic radicals, saturated and unsaturated cycloalkyl radicals, and aromatic radicals; and X is selected from the groups: —NH—, —O—, —S—

—O—$(CH_2)_p$—O—, and —S—$(CH_2)_p$—S—, $p$ being 1 to 6 and R" is selected from the group consisting of H, $CH_3$ and OH.

6. A process according to claim 5, wherein the reaction between the sulphur and the polysulphide is promoted in the presence of a tertiary aliphatic amine catalyst.

7. A process according to claim 5 wherein the reaction is conducted at a temperature between 140° and 160° C.

References Cited
UNITED STATES PATENTS

| | | | |
|---|---|---|---|
| 3,219,638 | 11/1965 | Warner | 260—79 |
| 3,352,837 | 11/1967 | Signouret | 260—79 |

DONALD E. CZAJA, Primary Examiner

M. I. MARQUIS, Assistant Examiner

U.S. Cl. X.R.

106—19 R, 287 SC; 117—123 D; 260—37 R, 79.1 R